United States Patent [19]

Berlin et al.

[11] Patent Number: 5,915,093
[45] Date of Patent: Jun. 22, 1999

[54] COMPUTER NETWORK DEBIT DISK USED FOR PREPAYMENT TO TRANSFER INFORMATION FROM A CENTRAL COMPUTER

[75] Inventors: Howard Berlin; Jack W. Bochsler, both of San Diego, Calif.

[73] Assignee: Howard Berlin, San Diego, Calif.

[21] Appl. No.: 08/845,590

[22] Filed: Apr. 24, 1997

[51] Int. Cl.[6] ................................................. G06F 13/00
[52] U.S. Cl. ............................... 395/200.49; 395/200.55; 395/200.57
[58] Field of Search ........................ 395/200.47, 200.54, 395/200.59, 200.48, 200.49, 200.55, 200.57, 187.01; 705/1, 26, 32; 380/25; 707/1, 10, 102, 104

[56] References Cited

U.S. PATENT DOCUMENTS

| | | | |
|---|---|---|---|
| 4,567,359 | 1/1986 | Lockwood | 235/381 |
| 4,795,892 | 1/1989 | Gilmore et al. | 235/381 |
| 4,882,779 | 11/1989 | Rahtgen | 380/24 |
| 5,010,571 | 4/1991 | Katznelson | 380/4 |
| 5,227,614 | 7/1993 | Danielson et al. | 235/380 |
| 5,272,320 | 12/1993 | Hakamada | 235/380 |
| 5,321,840 | 6/1994 | Ahlin et al. | 395/712 |
| 5,325,431 | 6/1994 | Naruse . | |
| 5,359,182 | 10/1994 | Schilling | 235/380 |
| 5,367,150 | 11/1994 | Kitta et al. | 235/380 |
| 5,408,417 | 4/1995 | Wilder | 705/5 |
| 5,438,184 | 8/1995 | Roberts et al. | 235/380 |
| 5,451,756 | 9/1995 | Holzer et al. | 235/381 |
| 5,457,746 | 10/1995 | Dolphin | 380/4 |
| 5,461,667 | 10/1995 | Remillard | 379/93.24 |
| 5,475,585 | 12/1995 | Bush | 705/26 |
| 5,483,445 | 1/1996 | Pickering | 705/40 |
| 5,491,326 | 2/1996 | Marceau et al. | 235/381 |
| 5,495,098 | 2/1996 | Pailles et al. | 235/492 |
| 5,502,806 | 3/1996 | Mahoney et al. | 345/326 |
| 5,511,114 | 4/1996 | Stimson et al. | 235/380 |
| 5,694,546 | 12/1997 | Reisman | 395/200.57 |
| 5,696,965 | 12/1997 | Dedrick | 707/10 |
| 5,706,493 | 1/1998 | Sheppard, II | 707/1 |
| 5,761,485 | 6/1998 | Munyan | 395/187.01 |
| 5,768,521 | 8/1998 | Dedrick | 395/200.46 |
| 5,790,790 | 8/1998 | Smith et al. | 395/200.49 |
| 5,809,145 | 9/1998 | Slik et al. | 380/25 |
| 5,815,665 | 9/1998 | Teper et al. | 395/200.59 |

OTHER PUBLICATIONS

"Series 200 PC Computer Vending Interface Module," IDI Multimedia Vending, Internet Publication, 1995.
"New Opportunities in Telecom," *Computer Telephony,* pp. 143–144, 146–147, 150, 152, 154–155, Apr., 1996.
"Millicent" Product Information, Internet Publication, Mar., 1997.

*Primary Examiner*—Zarni Maung
*Assistant Examiner*—Patrice L. Winder
*Attorney, Agent, or Firm*—Brown, Martin, Haller & McClain

[57] ABSTRACT

A method and system for retrieving a selected type of information from a remote computer via a computer network using a disk token purchased from a vendor that is associated with a certain type of information and a certain number of pre-paid access units. The information is provided by a central computer that is connected with the user's computer via a computer network such as the Internet. To receive information of the type for which the user has pre-paid, the user loads the disk token into a disk drive of the user's computer. Under control of software stored on the disk token, the user's computer establishes a telephone connection with the central computer and transmits a serial number associated with the disk token. The central computer verifies the authenticity of the serial number and also verifies that an account associated with that disk token has a sufficient access unit balance to cover the cost of the information. If the disk token is authentic and the account has a sufficient balance, the central computer initiates a transfer to the user's computer of information of the type for which the user has pre-paid. Alternatively, if such information is not stored in the central computer or otherwise readily accessible to it, the central computer may determine where such information may be found, retrieve it, and forward it to the user's computer via the telephone connection. The central computer then debits the account balance associated with the disk token.

20 Claims, 7 Drawing Sheets

COMPUTER NETWORK DEBIT DISK USED FOR PREPAYMENT TO TRANSFER INFORMATION FROM A CENTRAL COMPUTER

BACKGROUND OF THE INVENTION

1. Field of the Invention

The present invention relates generally to information retrieval via a computer network and, more specifically, to a software system that provides selected information from a host computer to a remote user via a computer network and debits the user's account balance.

2. Description of the Related Art

A consumer may use a debit card to purchase goods or services from a provider. To purchase goods or services, the consumer presents the card to the provider or provides other information to allow the provider to verify the authenticity of the card and that the consumer has a sufficient account balance to cover their purchase price. If the provider determines that the account balance is sufficient, the provider debits the account balance by the purchase price. Debit cards are commonly used to pay for retail goods of all types, telephone calls, highway tolls, mass transit fares, gasoline, restaurant meals, and other products and services.

In many instances the card itself is essentially non-functional and merely serves as a token to remind the consumer of the existence of the account. Nevertheless, many debit cards include an electronically readable memory medium in which a serial number is stored. The memory medium may be a magnetic stripe or a semiconductor memory. A card having a semiconductor memory may also include a microprocessor or similar means for controlling the transfer of information to and from the card. Such a card is commonly known as a smart-card. When a debit card having a memory medium is used to purchase goods or services, a machine reads the serial number or other information stored on the card to allow it to verify the authenticity of the card. To provide additional security against fraudulent use, the machine may require the user to enter a personal identification number (PIN).

A distinction may be drawn between the type of debit card that is used merely as a security and convenience mechanism to access an account that exists independently of the card, such as automatic teller machine (ATM) cards and other bank-issued debit cards, and the type of debit card that has an initial value representing a certain monetary amount that the consumer has paid to a provider or third-party reseller of certain goods or services in exchange for the card. The latter type of card is commonly referred to as a pre-paid debit card because the consumer is essentially pre-paying for the goods or services when the consumer purchases the card. Prior to or at the time the card is sold, the provider or reseller records the pre-payment in an account corresponding to that consumer or at least to that card.

The use of debit cards to pay for telephone calls has spawned a cottage industry. Such debit cards are sometimes referred to as pre-paid calling cards. Although a telephone company may issue such cards itself, it is becoming increasingly common for a reseller to purchase services in the form of an amount of calling time from one or more telephone companies and issue its own pre-paid calling cards to consumers under its own brand name. Although magnetic stripe cards and smart-cards may be used to pay for telephone calls, pre-paid calling cards more commonly include nothing more functional than a printed telephone number and access code. To make a telephone call using the card, the user dials the telephone number. A computer at the reseller's site answers the call and provides automated voice prompts to the user. The computer verifies the authenticity of the access code, which the user enters using the telephone keypad. If the computer verifies that the card is authentic and that the user's account balance is greater than zero, the system prompts the user to dial the number of the party to be called and completes the connection through the public telephone network. Security methods of the type used as fraud safeguards for ATM cards and credit cards, such as the requirement that the user enter a PIN, are generally unnecessary because the monetary value of the account balance is typically sufficiently low to expose the owner of the card to minimal loss in the event of fraud or theft. Certain resellers provide a service known as card reactivation that allows a user to increase the balance of their existing account by paying an additional amount. Nevertheless, pre-paid calling cards are more often considered disposable, and users commonly dispose of them rather than reactivate them when only a few cents worth of calling time remains in the account. Reselling such pre-paid calling cards is extremely lucrative because, in addition to the profits that volume calling time purchases and least-cost routing techniques realize for the reseller, the reseller may realize additional profit from the few cents of remaining calling time that often goes unused when the card is disposed of.

Pre-paid telephone debit cards have been used to purchase services other than telephone calling time. For example, service providers have provided automated voice messages informing callers of movie theater schedules.

In a manner analogous to the purchase of pre-paid telephone calling time, computer users may purchase pre-paid computing time from a computer service provider. For example, the computing departments of certain universities sell pre-paid computing time to students and other users who require use of the university's computer systems. A computer user may remotely access a university's host computer by dialing a telephone number and, when the connection is completed, providing a user name and a password. The user's remote computer, operating under control of suitable software, typically controls the dialing and entry of a password automatically without user intervention. If the host computer verifies the authenticity of the user name and password, it allows the user to control further operations from the remote computer. The host computer debits the computing time or connection time from the user's account balance. If the account balance is depleted, the host computer refuses the user's attempts to connect.

The Internet is a global computer super-network consisting of numerous sub-networks. The majority of users connect their computers to the Internet indirectly via a standard analog telephone connection or a digital services connection to an Internet service provider (ISP), whose computer is more directly connected to the Internet or one of its sub-networks. The user typically accesses the ISP computer in the same manner as described above with respect to computer service providers in general. The ISP typically bills its subscribers on a monthly basis for the connection time the subscriber has used.

An ISP typically provides free of additional charge to its subscribers the communication software that the subscriber's computer executes to connect to the ISP host computer. The communication software is typically provided on a floppy disk or a CD-ROM. Certain ISPs have provided such a floppy disk and a password free of charge that enable a user to connect to the ISP computer on a trial basis for a limited amount of time, during which the user can decide whether to subscribe to the ISP's service. If the user has not subscribed by the time the trial period ends, the ISP computer refuses any further attempts by the user to connect using the trial software.

The World Wide Web is a distributed hypermedia system in which multimedia information, such as combinations of text, still or moving images, and sound, is transferred via the Internet in accordance with the hypertext transfer protocol (HTTP). A software product known as a browser, executing on a user's computer, is used to retrieve the information and cause the user's computer to display it. An ISP may provide a browser to its subscribers that is integrated with the communication software. The Internet is a client-server system in which the user's remote computer operating under control of the browser constitutes a client platform that requests hypertext documents, and the host computer operating under control of its own software constitutes a server platform that provides the documents in response to the client's requests. Although, as noted above, the transferred documents may represent information of various media other than text, the term "hypertext" remains more popular than hypermedia to refer to the content of such documents. The prefix "hyper" refers to the embedding of links (hyperlinks) in a hypertext document that point to other hypertext documents or resources available on the World Wide Web. Using a mouse or similar point-and-click input device, a user can activate a hyperlink that the browser associates with a specific object or area of the document then-displayed on the user's computer screen. The browser interprets visual attributes of the document for display on the screen and interprets the effect of hyperlinks in accordance with the source language of the document, which is most commonly the hypertext mark-up language (HTML). In response to activation of a hyperlink, the client requests the information referenced by the hyperlink and displays it when it receives it from the server. The location or address at which a document is stored on the World Wide Web is described by a uniform resource locator (URL). The HTML code that defines a hyperlink includes a reference to a URL.

A user may purchase goods or services via the Internet. The term "electronic commerce" is commonly used to refer to such transactions. Merchants may provide information and offers regarding their products in the form of hypertext documents that they publish on the World Wide Web. A user may pay for a purchase by entering credit card information or other account-identifying information on a hypertext form and transmitting it to the merchant's server. The product may be shipped to the user by conventional means or it may be delivered electronically via the Internet itself. Software, stock photographs, and other products sold in digital form may be transmitted directly to the user's computer in exchange for payment.

It has been suggested that smart-cards be used to pay for purchases made via the Internet. A product referred to as a smart-disk has been used to adapt a floppy disk drive to communicate with a smart-card. It has also been suggested to simply include a smart-card "drive" as a computer peripheral in addition to a conventional floppy disk drive or CD-ROM drive to facilitate electronic commerce.

Many users of the World Wide Web (referred to hereinafter as the "Web") would prefer not to spend their time searching the Web for products they might be interested in purchasing. Searching the Web is inefficient because the user remains connected to the ISP and may continue to incur charges for the connection time. Although certain ISPs have offered a flat-rate plan in which a user receives a bill for a fixed amount each month regardless of the connection time, many people who would otherwise be interested in purchasing products via the Internet do not do so. Some people may be resistant to becoming sufficiently familiar with the use of the browser software needed to search the Web and the arcane procedures for installing new software in their computer. Others may prefer shopping by conventional non-electronic methods, because they believe the likelihood of finding on the Internet the product or service they seek is small in relation to the time spent searching. Moreover, many people are resistant to providing credit card information via the Internet for fear that the information will be intercepted by others and used fraudulently. These needs are clearly felt in the art and are satisfied by the present invention in the manner described below.

SUMMARY OF THE INVENTION

The present invention relates to a method and system for retrieving a selected type of information from a remote computer via a computer network in response to a prepayment. A user purchases a portable computer data storage medium device, such as a floppy disk or CD-ROM, from a vendor. The storage medium device (referred to hereinafter for convenience as a disk token) is associated with a certain type of information and a certain number of pre-paid access units, both of which may be indicated on the disk token itself or on packaging in which the disk token is sold. The access units may be units of time or units of information. For example, the disk token may be associated with real-estate listings, weather reports, traffic reports, stock market quotations, listings of advertisements for a specific class of goods or services for sale, or any other product that a user may wish to receive that can be transmitted to the user in digital format. The information is provided by a computer that is connected with the user's computer via a computer network such as the Internet.

To receive information of the type for which the user has pre-paid, the user loads the disk token into a suitable data storage drive, such as a disk drive, of the user's computer. The user's computer may communicate with a central computer on the computer network via a telephone line modem connection or via any other suitable type of connection. In an illustrative embodiment, the user's computer has a telephone line modem connection. Under control of software stored on the disk token, the user's computer establishes a telephone connection with the central computer and transmits a token identifier. The token identifier may be a serial number and may be stored on the disk token as computer-readable data, printed on the disk token or its packaging in a manner readable by the user, or similarly associated with the disk token. The central computer verifies the authenticity of the token identifier and also verifies that an account associated with that disk token has a balance that exceeds a predetermined number of access units, such as zero. If the disk token is authentic and the account has a sufficient balance, the central computer may initiate a transfer via the telephone connection to the user's computer of information of the type for which the user has pre-paid. Alternatively, if such information is not stored in the central computer or otherwise readily accessible to it, the central computer may determine where such information may be found, retrieve it, and forward it to the user's computer via the telephone connection. For example, the central computer may select a remote computer associated with type of information for which the user has pre-paid, and establish a connection with that remote computer. For example, if the information type is real-estate listings, the central computer selects a remote computer that is associated with real-estate listings. The central computer then initiates a transfer of information of that type from the remote computer and, in turn, transfers the information to the user's computer. The central computer debits the account balance associated with the disk token as the access units are consumed. If the account balance is reduced below the predetermined number of access units, further transfers are prevented.

The invention may further include a method for reactivating the disk token if the account balance is depleted. For example, the user may contact the issuer of the disk token by telephone and pay by credit card for a number of additional access units.

The user need not understand how to search the Internet because the user purchases a disk token that is associated only with information of the type in which the user is interested. The disk token cannot be used to retrieve any other type of information. The user need not understand software installation or operating procedures because the software is contained on the disk token and establishes a connection with the host computer with essentially no user intervention. Moreover, the user may retrieve information for value without transmitting a credit card number over the Internet, where it may be subject to interception. Even if an unscrupulous party were to intercept the identifying information and use it to fraudulently represent to the central computer that that party has pre-paid for the associated information, the potential monetary loss to the true purchaser of the debit disk token is limited to the amount he has pre-paid.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
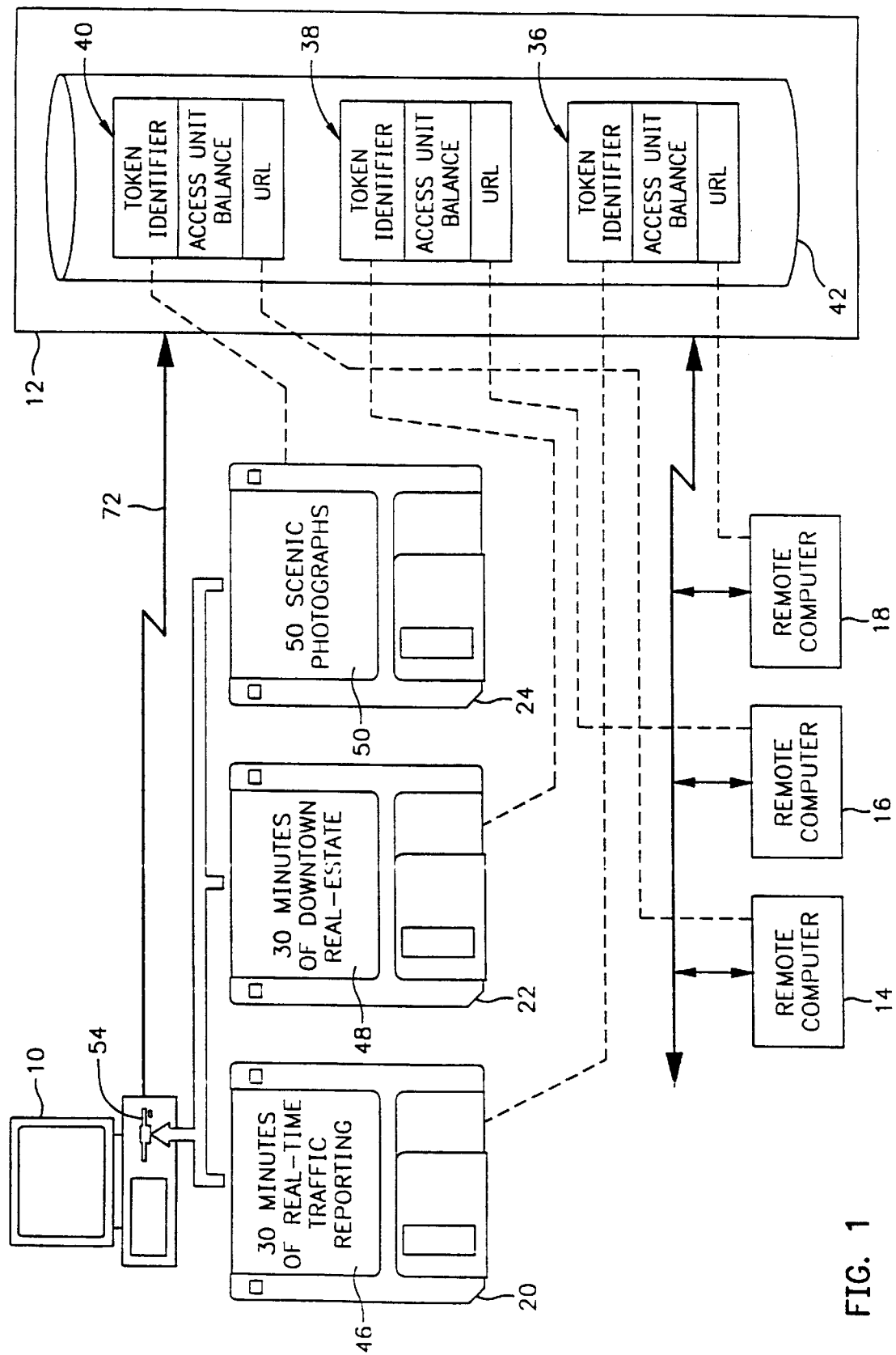
FIG. 1 illustrates a system for controlling access to electronically stored information on a computer network using pre-paid disk tokens.

As illustrated in FIG. 1, the system includes a user computer 10, a host or central computer 12 and remote computers 14, 16 and 18. A user (not shown), who has access to user computer 10, purchases one of disk tokens 20, 22 and 24 from a vendor (not shown) in exchange for a monetary payment. Each of a number of other users may similarly purchase one of the other disk tokens 20, 22 and 24. Although floppy disks are illustrated, disk tokens 20, 22 and 24 may alternatively be CD-ROMs or any other suitable type of portable computer data storage medium.

Figure 2:
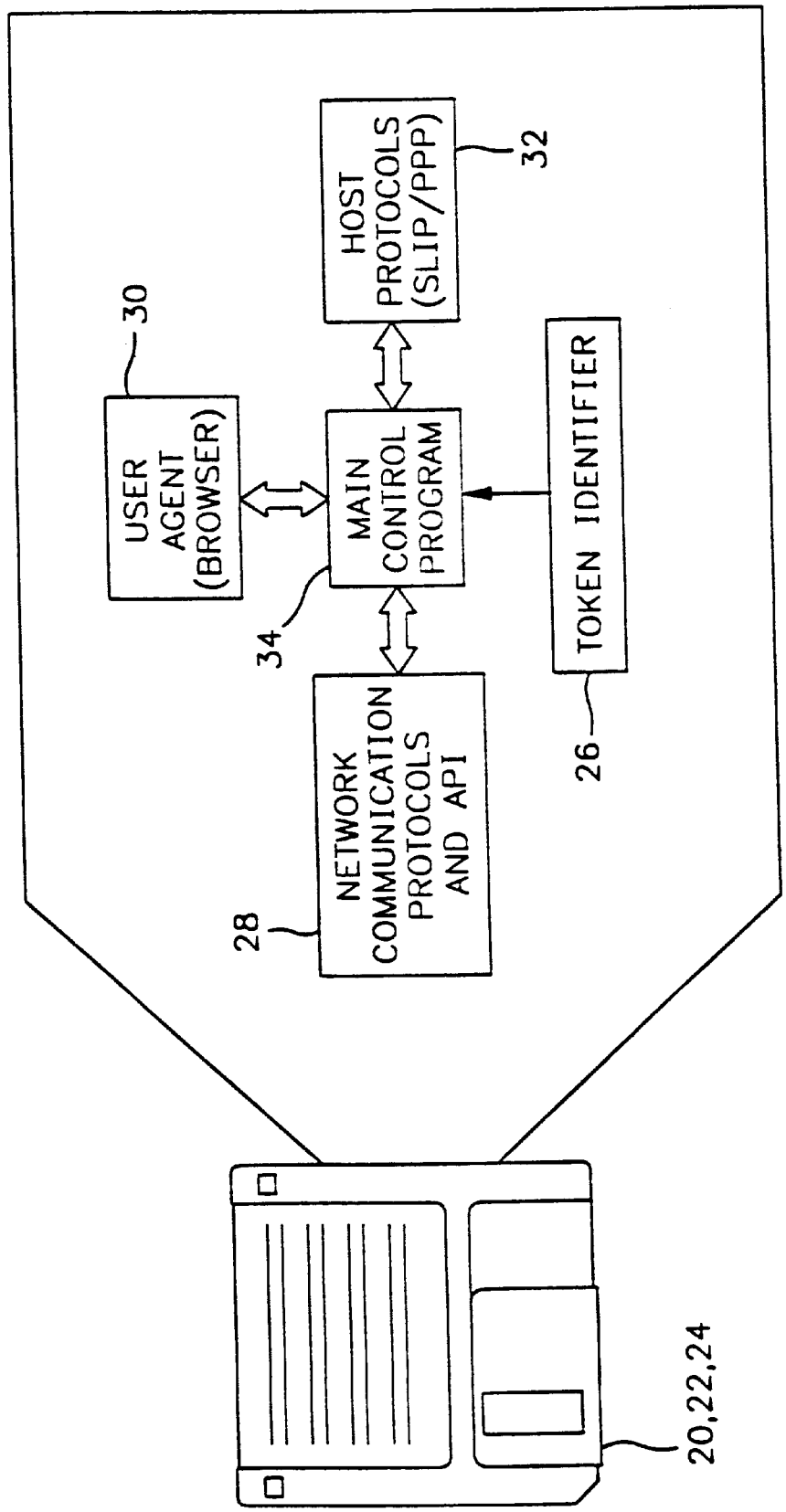
FIG. 2 illustrates software stored on the disk token.

As illustrated in FIG. 2, each of disk tokens 20, 22 and 24 has software recorded on it that preferably includes a token identifier 26, network communication protocol and application program interface 28, an integral browser or user agent 30, host communication protocol 32 and a main control program 34. The organization of this software is illustrated in a conceptual manner in FIG. 2 and does not necessarily reflect the structure of any underlying code that a programmer would write to implement it. In view of the teachings in this patent specification, however, those of skill in the art will readily be capable of writing such code and determining a suitable manner for structuring it. Indeed, the software of the present invention may be coded in any suitable programming language and structured in a manner that is suitable for the selected programming language, operating system and communication protocols.

In the illustrated embodiment, token identifier 26 is preferably a serial number that uniquely identifies the disk token on which it is stored. Thus, for example, the token identifier 26 stored on disk token 20 is different from that stored on disk tokens 22 and 24 and any other disk tokens. Similarly, the token identifier 26 stored on disk token 22 is different from that stored on disk tokens 20 and 26 and any other disk tokens.

Token identifier 26 corresponds to an information type. The information type refers to a category of information that a user may desire to receive. For example, the information type of disk token 20 may be real-time traffic reporting. Similarly, the information type of disk token 22 may be downtown real-estate listings. The information type of disk token 24 may be scenic photographs. In general, the information type may refer to any category of information that can be represented in a digital format. The exemplary information types described herein are intended only to be illustrative of types or categories of electronically stored digital information to which the present invention may facilitate access. In view of these exemplary types and the teachings herein, many other types will readily occur to those skilled in the art.

Each of disk tokens 20, 22 and 24 has a corresponding value. The purchase price that the user pays to the vendor may be proportional to this value. For example, the value of each of disk tokens 20 and 22 may be thirty minutes. Similarly, the value of disk token 24 may be fifty photographs. As these examples illustrate, the value may be in units of time or in units of information. The operator of central computer 12 or an entity associated with the operator creates disk tokens 20, 22 and 24 and issues them to the users either by selling them directly to users or by selling them to third parties for resale to users. When each of disk tokens 20, 22 and 24 is created, a corresponding token record 36, 38 and 40, respectively, is stored in a memory 42 in central computer 12. This correspondence is indicated by dashed lines in FIG. 1.

Each of token records 36, 38 and 40 includes a copy of token identifier 26, an access unit balance, and a uniform resource locator (URL). In an embodiment in which token identifier 26 is a serial number, the copy of token identifier 26 in each token record is a copy of the serial number associated with the corresponding disk token. The access unit balance is the value of the disk token in units of time or units of information. The URL is that which points to the address or resource location on the World Wide Web from which information of the information type corresponding to the disk token may be retrieved, as illustrated by dashed lines in FIG. 1. For example, disk token 20 corresponds to the token identifier included in token record 36, and the URL included in token record 36 points to remote computer 18. Thus, in this exemplary system, real-time traffic reporting information may be retrieved from remote computer 18. It is of only peripheral concern to the present invention exactly what the information consists of or how the information is gathered and made available via the World Wide Web. It is only necessary that the information is in fact made available on a Web server, i.e., a remote computer connected to the Web, in a manner that allows it to be retrieved using the well-established Web protocols with which persons of skill in the art are familiar. In the case of real-time traffic information, for example, practitioners in the art have constructed Web "sites," i.e., resource locations, that provide real-time traffic information gathered using roadway sensors or video cameras. Such real-time information is ideally suited for distribution to users via the present invention because the users can pre-pay for the information in units of time. Gathering essentially any type of real-time information and making it available on a Web server is well-within the level of skill in the art. Similarly, disk token 22 corresponds to the token identifier included in token record 38, and the URL included in token record 38 points to remote computer 16. Thus, in this exemplary system, downtown real-estate listings are stored on remote computer 16. The multiple listing system (MLS), for example, is a type of real-estate listing that is conventionally provided via a proprietary computer network. Nevertheless, any type of real-estate information would be a suitable information type to adapt for transfer using the present invention. Similarly, disk token 24 corresponds to the token identifier included in token record 40, and the URL included in token record 40 points to a resource location on remote computer 14. Thus, in this exemplary system, scenic photographs are stored on remote computer 14. It is well-known that still photographs and moving images may be transferred via the Web. Thus, such information would be suitable for transfer using the present invention. In summary, the information may be of any type that it is known in the art to provide via the Web or a similar computer network or that would readily occur to persons skilled in the art to provide via the Web or similar computer network in view of these teachings.

The resource location referenced by the URL may be physically located in any computer on the network, because the inherent routing capabilities of the Internet ensure that the information will be properly retrieved. The information retrieved from one of the remote computers may be routed through any number of intermediate computers on the network before it reaches central computer 12. Furthermore, although illustrated as such for purposes of clarity, each URL need not reference a physically distinct remote computer on the network. Rather, a single remote computer may provide information of multiple information types. An inherent advantage of the Web is that only the URL of the resource and not its physical location need be known to retrieve the resource.

Figure 3:
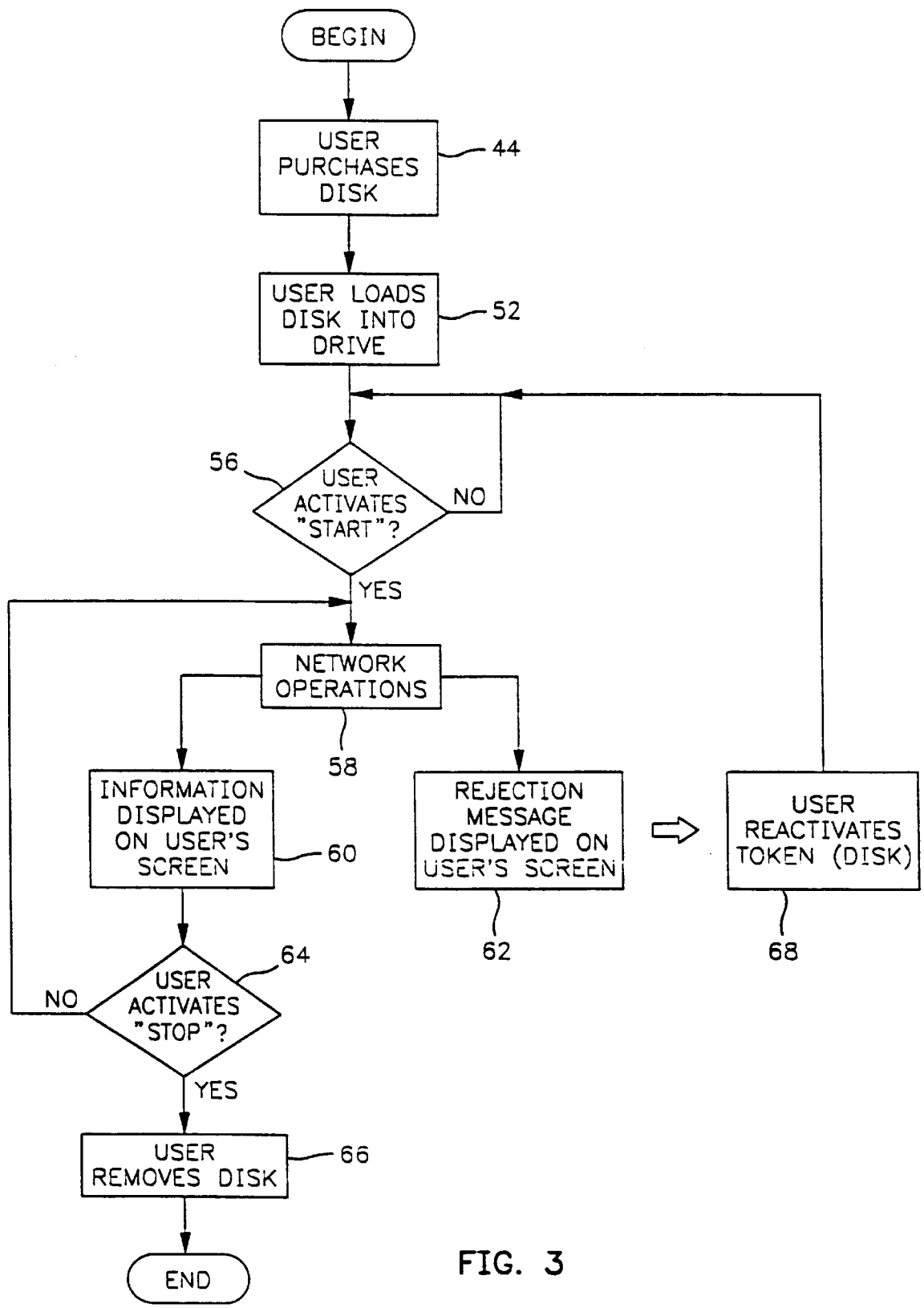
FIG. 3 illustrates a method for using the system illustrated in FIG. 1.

As illustrated in FIG. 3, the first step 44 in the process by which a user uses the present invention is for the user to purchase a disk token, such as one of disk tokens 20, 22 and 24. As described above, each disk token has a unique value that corresponds to the access unit balance included in a token record stored on central computer 10. The value is preferably indicated on a printed label affixed to the disk token or its packaging, such as the numeric quantity in the disk token titles "Thirty Minutes of Real-Time Traffic Reports," which is printed on label 46 of disk token 20, "Thirty Minutes of Downtown Real-Estate," which is printed on label 48 of disk token 22, or "Fifty Scenic Photographs," which is printed on label 50 of disk token 24. The user pays a monetary amount corresponding to this value to a vendor of the disk tokens. Each disk token is preferably sold to the user in tamper-evident packaging (not shown) to provide the purchaser with a degree of assurance that the access unit balance corresponding to that disk token has not been previously debited by a fraudulent user, i.e., a user who did not purchase that disk token. The disk token may also have its serial number or other token identifier printed on it in a manner that is not visible until the user opens the packaging. The vendor may provide a selection of disk tokens corresponding to different information types in which the vendor believes prospective users will be interested. Nevertheless, every disk token offered for sale should have a unique token identifier.

The operator of central computer 10 or associated entity that issues the disk tokens may purchase the information from operators of the remote computers, such as remote computers 14, 16 and 18. The issuer attempts to re-sell the information by selling the corresponding disk tokens. The vendor's role in the process is thus directly analogous to that of an issuer of pre-paid telephone calling cards who resells telephone calling time. The issuer of the disk tokens may sell them directly or via intermediaries.

Figure 4:
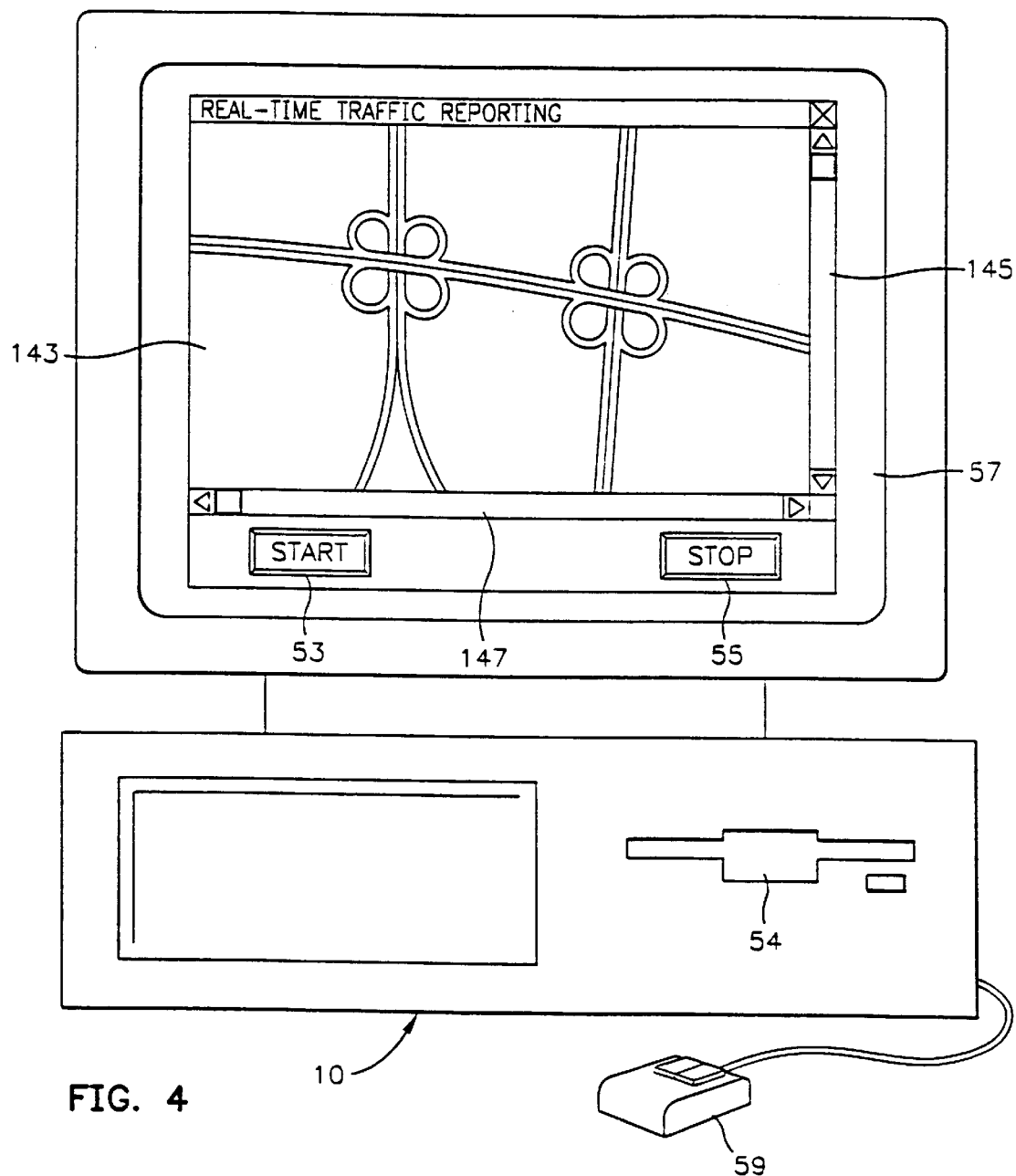
FIG. 4 illustrates an exemplary screen display of a user computer.

At step 52 the user loads the disk token into the disk drive 54 (see FIGS. 1 and 4) of computer 10. Other than the selection of a disk token to purchase, the present invention preferably provides the user with few choices, thereby minimizing complexity. As illustrated in FIG. 4, preferably, the user's only choices are indicated by an icon representing a "Start" button 53 and an icon representing a "Stop" button 55, although a "Continue" button (not shown) may be a suitable alternative to the "Stop" button 55. Buttons 53 and 55 are displayed on the screen 57 of computer 10. At step 56 the user activates "Start" button 53 using a mouse 59 or similar point-and-click input device. At step 58, the network operations that are described in detail below are conducted. As a result of the network operations, either information of the type corresponding to the disk token is transferred to computer 10 and displayed on screen 57 at step 60, or a rejection message is displayed on screen 57 at step 62. The rejection message (not shown) may indicate either than the disk token is unrecognized or that the access unit balance is insufficient to cover the value of the information. If the information is displayed, the user may activate "Stop" button 55 at step 64 to halt further transfers and displays of information. If the user does not activate "Stop" button 55, the process returns to step 58. Thus, information of the information type corresponding to the selected disk token is continually transferred and displayed until the access unit balance becomes insufficient. For example, using disk token 20, the user may view traffic information that is continually updated essentially in real-time, i.e., as traffic conditions change. Alternatively, this second button may be a "Continue" button (not shown). Information would not be continually transferred and displayed; Rather, one additional transfer and display of information corresponding to the selected disk token would occur each time the user activates the "Continue" button. For example, using disk token 22, the user may view a different real-estate listing or, using disk token 24, a different photograph, each time the user activates the "Continue" button. When the user no longer desires to receive information, the user may remove the disk from disk drive 54 at step 66.

If the rejection message is displayed at step 62 and indicates an insufficient access unit balance, the user may manually place a telephone call at step 68 to the issuer of the debit disk. The user identifies the debit disk in a suitable manner, such as by verbally reading to the issuer the serial number printed on the disk token. The user verbally provides credit card information to the issuer to pre-pay for additional information in a manner analogous to that in which a user of a pre-paid telephone calling card may reactivate a depleted card. In exchange for the additional prepayment, the issuer increases the access unit balance of the token record corresponding to the user's disk token.

Figure 5:
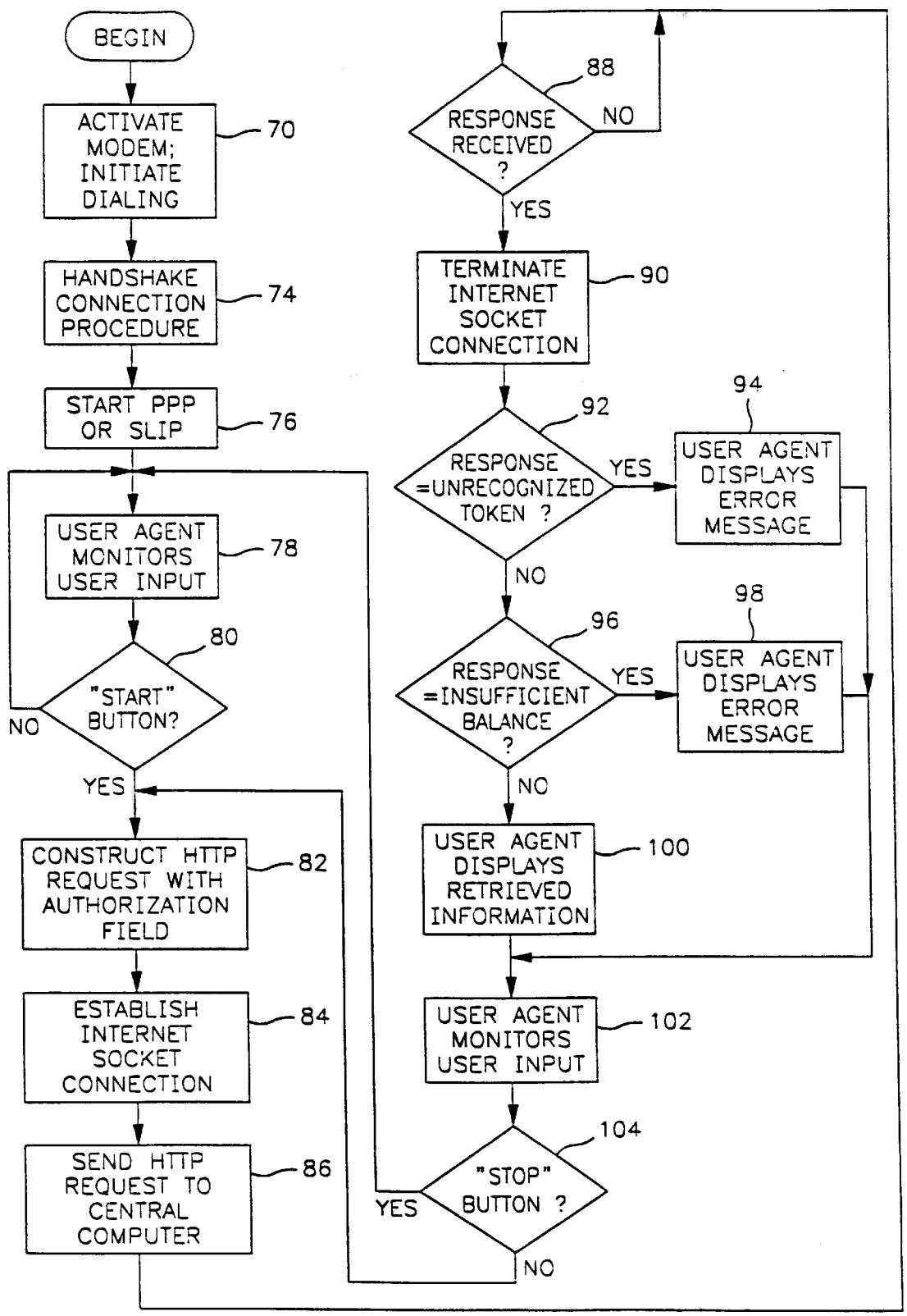
FIG. 5 is a flow chart illustrating the software-controlled method that a user computer performs.

The following is a more detailed description of the cooperation among user computer 10, central computer 12 and one of remote computers 14, 16 and 18 when the invention is used in the manner described above in a preferred embodiment involving the Web. FIG. 4 illustrates the operation or process defined by the software stored on the disk token and shown conceptually in FIG. 2. This software causes user computer 10 to operate in the manner of a client in the client-server environment that characterizes the Internet. FIG. 5 illustrates the operation of the software stored in central computer 12. This software causes central computer 12 to operate in the manner of a server with respect to information transferred from it to user computer 10, and in the manner of a client with respect to information transferred to it from remote computers 14, 16 and 18. Persons skilled in the art will readily be capable of producing suitable software code for controlling computers 10 and 12.

As illustrated in FIG. 5, user computer 10 operates under the control of the following software process. At step 70 user computer 10 activates a modem (not shown) that is connected to the public telephone network 72 (FIG. 1). Central computer 12 has a modem (not shown) that is similarly connected to public telephone network 72. The modem of user computer 10 dials a telephone number associated with central computer 12. When the modem of central computer 12 answers the call, the two modems perform a handshake connection procedure at step 74 in the conventional manner. At step 76 computer 10 starts a serial data communication protocol 32 (see FIG. 2), such as the Point-to-Point Protocol (PPP) or Serial Link Internet Protocol (SLIP) that Internet Service Providers commonly use to communicate with their subscribers. Starting PPP or SLIP enables computers 10 and 12 to subsequently communicate using a bidirectional protocol known as Transmission Control Protocol (TCP)/ Internet Protocol (IP). Computer 10 starts the PPP or SLIP protocol locally as well as remotely in computer 12 in the conventional manner.

At step 78 computer 10 starts user agent 30 (see FIG. 2). User agent 30 is essentially an integral special-purpose browser. Like a conventional browser, it requests hypertext documents in accordance with the hypertext transfer protocol (HTTP) and monitors for user input provided via the computer's keyboard or point-and-click device (not shown). Nevertheless, as described above, user agent 30 limits the type of user input to essentially two types: activation of "Start" button 53 and activation of "Stop" button 55 or a "Continue" button. Furthermore, unlike a conventional browser, user agent 30 does not enable a user to manually input a URL or otherwise select an arbitrary resource location from which to retrieve information. The user is limited to that resource location which corresponds to the disk token. Computer 10, under the control of user agent 30, generates the button icons and monitors for activation of them by the user in the conventional manner. If computer 10 determines at step 80 that "Start" button 53 was not activated, it returns to step 78 and continues monitoring until "Start" button 53 is activated. If computer 10 determines at step 80 that "Start" button 53 was activated, it proceeds to step 82.

At step 82 computer 10 constructs an HTTP request having an authorization field that contains token identifier 26 (see FIG. 2). As described above, in the illustrated embodiment, token identifier 26 is stored on the disk token in a manner electronically readable by user computer 10. User computer 10 may thus obtain token identifier 26 by reading it in the same manner as it would conventionally read data stored on a disk. Nevertheless, in other embodiments, the user may read a token identifier that is printed on the disk token or its packaging and enter it into computer 10 using the computer's keyboard (not shown). The HTTP version 1.0 definition provides an authorization mechanism that a programmer of Internet client software may use for the purpose of transmitting a password or similar authorization word along with a request. As those familiar with Internet programming will understand, the authorization field is simply appended to the client request that includes token identifier 26. Token identifier 26 should be encoded in the base-64 format specified by the protocol definition for the authorization field.

At step 84 computer 10, which functions as the client, establishes an Internet client socket connection with computer 12, which functions as a server. The software under which computer 10 is controlled identifies computer 12 by providing an Internet Protocol address. As those familiar with Internet programming will understand, standard "Berkeley" Internet application program interface (API) software is widely available to facilitate such manipulation of sockets. Similar software is commercially available from, for example, Rogue Wave Software of Corvallis, Oreg. under the name "Inter.Net.h++," which is a C++ class library that simplifies Internet programming by providing the programmer with an object-oriented interface to inter-process communication and network communication services through an open and extensible architecture. Such software, which may be used to implement steps 82 and 84 and similar steps described below that involve constructing and responding to HTTP requests and creating and terminating sockets, is conceptually represented in FIG. 2 by network communication protocol and application program interface 28.

The above-described steps for establishing communication between user computer 10 and central computer 12 relate only to an embodiment of the invention in which the two computers communicate using Internet protocols. In other embodiments, other protocols may be used. Certain embodiments, for example, may take advantage of the fact that a dedicated or persistent telephone connection exists between the computers, thereby simplifying the communication protocol requirements. Internet Protocols are connectionless and stateless, meaning that each transfer of information is independent, and that the path from the client to the server need not be physically, i.e., electrically, continuous during the information transfer. Rather, only a "virtual connection" exists between client and server on the Internet. The information is physically transmitted in packets that may be routed via multiple paths from the client to the server. The Internet protocols are preferred despite the existence of a persistent physical connection between computers 10 and 12 because it enhances the flexibility of the system. The system would not be significantly different from that illustrated if the illustrated portion public telephone network 72 were replaced in whole or in part by a portion of the Internet. Thus, in other embodiments, user computer 10 may establish communication with an intermediate computer (not shown) via the telephone network, and the intermediate computer in turn establishes communication with central computer 12 via the Internet.

At step 86 computer 10 transmits the HTTP request to computer 12 via the network connection formed at step 84. At step 88 computer 10 waits for a response from computer 12. After it receives a response, at step 90 computer 10 terminates the socket connection with computer 12.

Computer 10 parses the HTTP response received from computer 12. As described below, computer 12 may respond to the request by transmitting the requested information or by transmitting an error indication. The error indication may indicate either that the disk token has a token identifier 26 that computer 12 did not recognize or that the access unit balance corresponding to the disk token is insufficient to cover the requested information. If at step 92 computer 10 determines that the former error indication was received, it proceeds to step 94. Otherwise, it proceeds to step 96. If at step 96 computer 10 determines that the former error indication was received, it proceeds to step 98. Otherwise, it proceeds to step 100.

Error indications are handled as follows. At step 94, through user agent 30 (see FIG. 2) computer 10 displays a suitable error message on its screen, such as "Unrecognized Disk Token," and proceeds to step 102. Alternatively, at step 98, through user agent 30 computer 10 displays a suitable error message on its screen, such as "Insufficient Account Balance," and similarly proceeds to step 102.

If no error indication was received, at step 102, through user agent 30 computer 10 displays the received information. Like a conventional browser, user agent 30 displays the information in accordance with the hypertext markup language (HTML). As described above, this information is that which corresponds to the information type of the disk token. For example, if the disk token were disk token 20, computer 10 would display the real-time traffic report information it received.

At step 102 computer 10, still under control of user agent 30, monitors for user input as described above with respect to step 80. The only user input choice that has any effect is activation of the "Stop" button. If computer 10 determines at step 104 that the "Stop" button is activated, it returns to step 78, where it awaits until "Start" button 53 is again activated, as described above. If "Stop" button 55 is not activated at step 104, computer 10 returns to step 82, where it repeats the steps described above whereby information is retrieved and displayed on the screen. In the exemplary case of real-time traffic report information, successively retrieved documents would presumably reflect the state of roadway traffic in a certain geographic area at the time at the time that computer 10 receives it, i.e., in "real-time," but for whatever time delay is inherent in the gathering and transmission of such information. Thus, information is continually updated until the user activates the "Stop" button. Alternatively, the information may be updated only upon activation of a "Continue" button by the user. A "Continue" button may be more suitable for information that is received in discrete units, such as information relating to one real-estate listing of the information type relating to disk token 22 or one photograph of the information type relating to disk token 24.

Figure 6A:
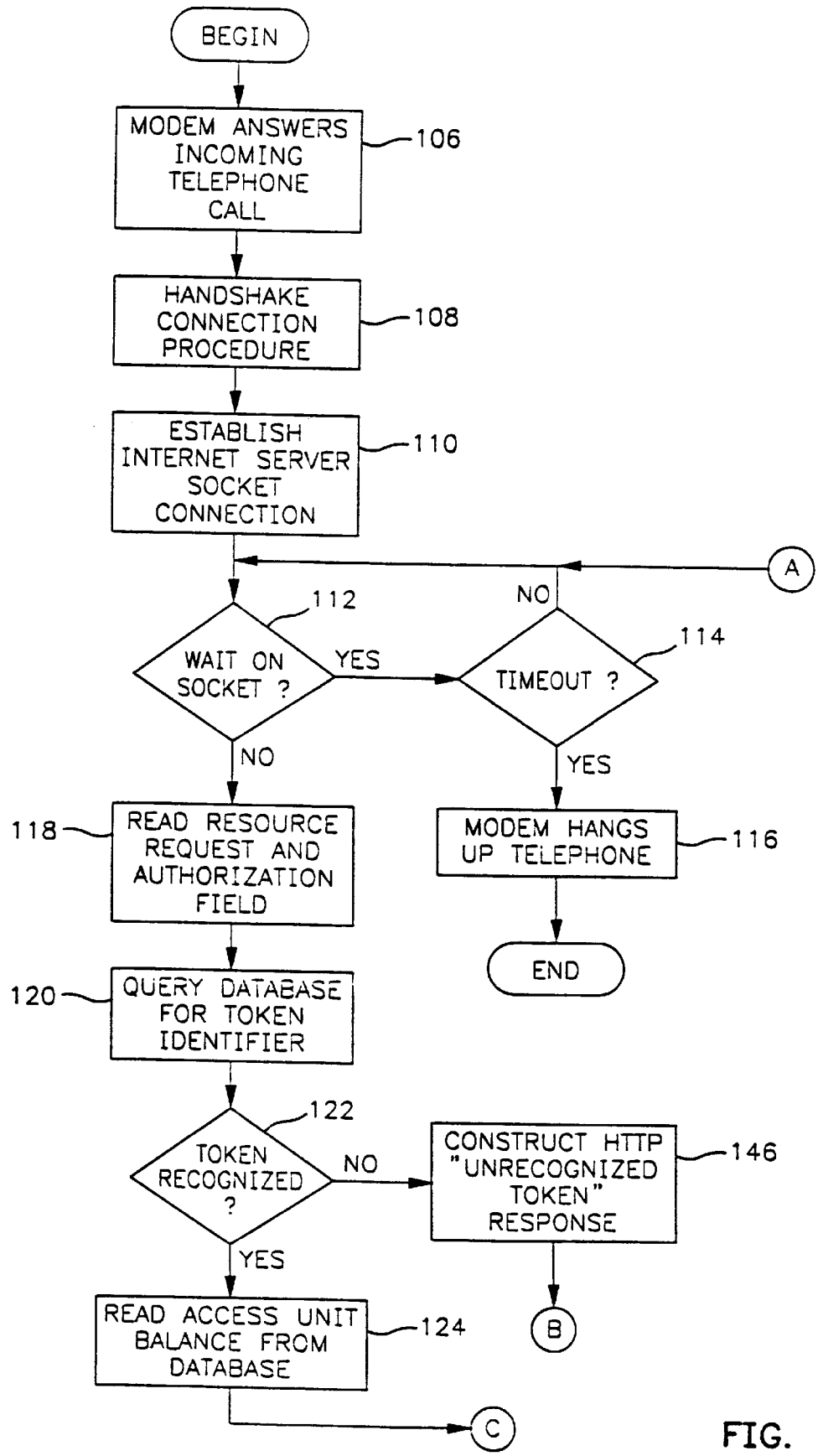
FIGS. 6A and 6B are a flow chart illustrating the software-controlled method that a central computer performs.
Figure 6B:
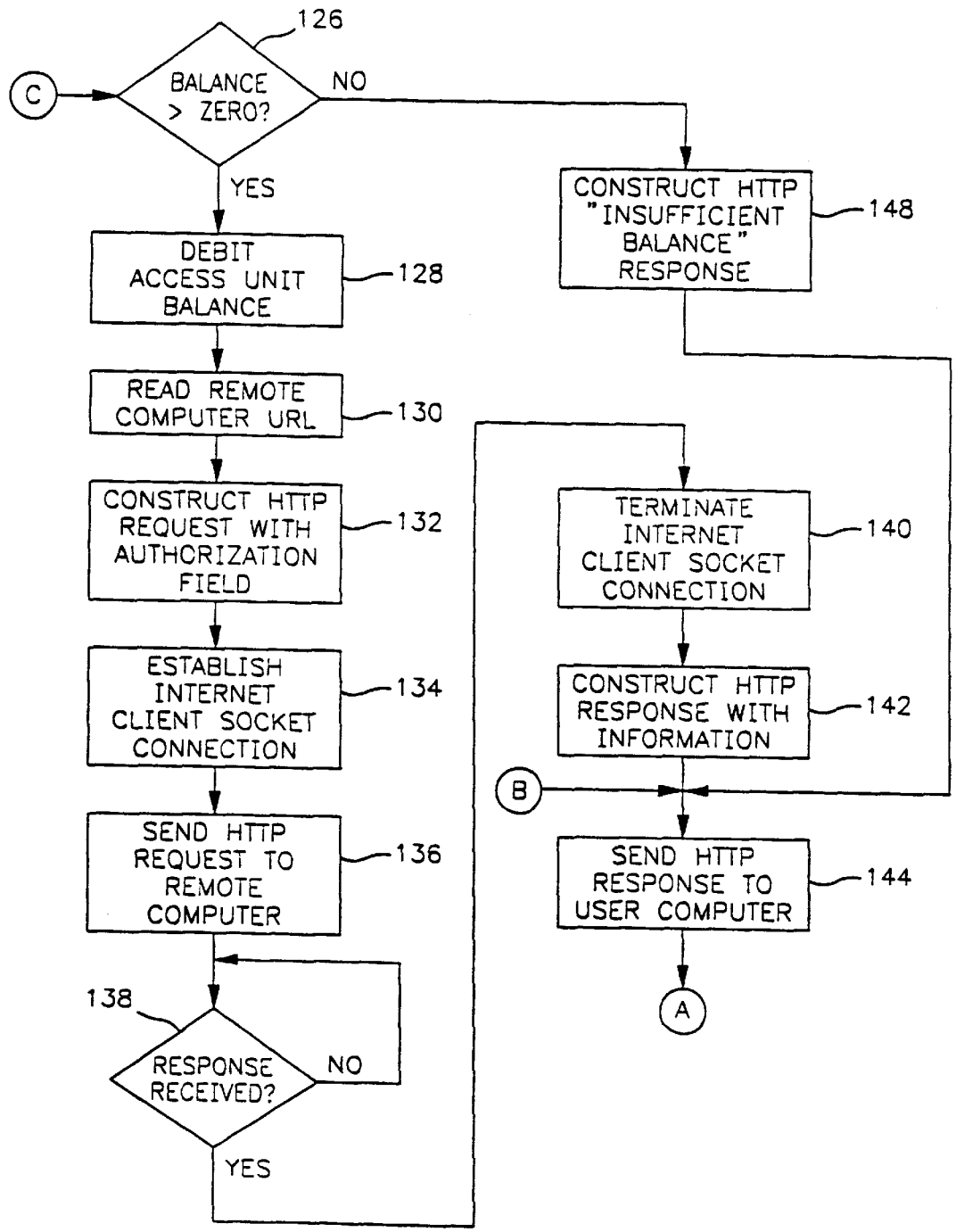

As illustrated in FIG. 6, central computer 12 operates under the control of the following software process. At step 106 central computer 12 uses a modem (not shown) to answer the telephone call placed by user computer 10 in the manner described above. At step 108, central computer 12 participates in the conventional manner in the handshake procedure described above with respect to step 74. At step 110 computer 12, which functions as a server with respect to computer 10, establishes an Internet server socket connection and binds this socket to an Internet Protocol address to which a client computer may connect. At step 112 computer 12 waits on the socket until computer 10 connects to it. At step 114, if computer 10 determines that it has been waiting on the socket for more than a predetermined timeout period, such as five minutes, then it proceeds to step 116 and hangs up the telephone call. When computer 12 has accepted the attempt by user computer 10 to connect to the socket, it proceeds to step 118. A programmer may use the same types of API and other software tools described above to simplify the implementation of these steps in the software controlling computer 12.

At step 118 computer 12 parses the HTTP resource request received from user computer 10 to read the authorization string that represents token identifier 26 (see FIG. 2). At step 120 computer 12 inputs the authorization string as a query to a database, represented in FIG. 1 by memory 42. The database may be any suitable database, including commercially available database programs such as ORACLE and SYBASE. Persons skilled in the art will readily be capable of integrating such a commercially available database with the other software under which central computer 12 operates, especially in view of the fact that it is well-known in the art to use such database programs to organize information stored on a server computer for retrieval via the Internet.

The database organizes the token records. As described above with respect to FIG. 1, the elements of each token record in the database consist of a token identifier that corresponds to exactly one of the disk tokens, an access unit balance that indicates the amount of the user's prepayment remaining on account, and a URL that references a remote computer resource location on the network from which information of the information type corresponding to that disk token may be retrieved. In response to the query, the database program searches the token records, such as token records 36, 38 and 40, to determine whether the authorization string matches the token identifier stored in any of the token records. If a match is detected at step 122, computer 12 proceeds to step 124 and uses the database to retrieve the corresponding access unit balance stored in that token record. At step 126 computer 12 determines whether the retrieved access unit balance is greater than a predetermined threshold, such as zero. If the balance is greater than zero, indicating that the balance is sufficient to cover the value of a unit of information of the requested type, computer 12 proceeds to step 128. At step 128 computer 12 debits that access unit balance. The amount debited may be predetermined in any suitable manner. If the access units are units of information, the account balance may be debited by one unit. If the access units are units of time, the account balance may be debited by one minute or a similar approximation of the time required to transfer information in response to each request.

At step 130 computer 12 uses the database to retrieve the corresponding URL stored in that token record. Computer 12 then retrieves the information referenced by the URL to from a resource location, such as those represented by remote computers 14, 16 and 18 in FIG. 1. In the connection between central computer 12 and the selected remote computer, central computer 12 functions as the client, and the selected remote computer functions as the server. At step 132 computer 12 constructs a HTTP request that includes an authorization field. The remote computer uses the authorization string to ensure that it provides information only in response to an authorized requester. Although the system would function in essentially the same manner without an authorization string, an authorization string is preferred because it prevents users from attempting to obtain the information free of charge by accessing the remote computers directly using a conventional Web browser and bypassing the method of the present invention. Because a conventional Web browser or similar program could be used in this manner, it is preferred to include an authorization string that identifies computer 12 as an authorized requestor. Without knowledge of the authorization string, a person cannot access the remote computer. The authorization string should be different from that which computer 10 includes when constructing the request described above with respect to step 82 of FIG. 5, because multiple disk tokens may be used to retrieve the same information from the same remote computer.

At step 134 central computer 12 establishes a client socket connection with the remote computer referenced by the URL retrieved from the database. At step 136 computer 12 sends the HTTP request to the selected or referenced remote computer. For example, if the database retrieves the URL stored in token record 36, that URL is used to form a connection with remote computer 18 and send a HTTP request to it. At step 138 central computer 12 waits to receive a response to its request.

Following receipt of a response from the selected remote computer, computer 12 terminates its client socket connection at step 140 and forwards the information contained in the response to user computer 10. At step 142 computer 12 constructs a HTTP formatted response that includes the information. As described above, the information may include digital representations of any of the media that may be transferred in accordance with the protocol, such as images, text and sound. Computer 12 formats the information into the form of a hypertext document in accordance with the protocol. As shown in FIG. 4, the displayed document 143 may include "Start" and "Stop" buttons 53 and 55, as well as scroll bars 145 and 147 and any other features commonly associated with HTTP formatted hypertext documents. At step 144 computer 12 sends the HTTP response to user computer 10 via the client-server socket connection described above with respect to step 110. Computer 12 then returns to step 112 to wait for the next request.

If computer 12 determines at step 122 that the disk token has a token identifier 26 that matches no token identifier stored in the database, it proceeds to step 146. At step 146 computer 12 constructs a HTTP formatted response that includes a suitable error message, such as the text "DISK TOKEN UNRECOGNIZED," and proceeds to step 144 at which it sends that response to user computer 10. If computer 12 recognizes the disk token at step 122 but determines at step 126 than the corresponding access unit balance is less than or equal to zero, it proceeds to step 148. At step 148 computer 12 constructs a HTTP formatted response that includes a suitable error message, such as the text "Insufficient Account Balance," and proceeds to step 144 at which it sends that response to user computer 10.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for retrieving a selected type of information from a remote computer resource location via a computer network in response to a prepayment, comprising the steps of:

providing a plurality of data storage media, each data storage medium having recorded thereon communication software, each data storage medium having associated with it a token identifier corresponding to an information type of a plurality of predetermined information types;

providing a central computer having a connection to a computer network and a memory for storing token records, each token record corresponding to one computer data storage medium and including said token identifier and a corresponding access unit balance;

issuing each said data storage medium to a customer in exchange for a payment corresponding to said access unit balance;

loading a selected one of said data storage media into a customer computer;

establishing data communication between said central computer and said customer computer under control of said communication software recorded on said selected one of said data storage media;

receiving said token identifier recorded on said selected one of said data storage media at said central computer;

comparing said received token identifier to said token identifier of said token records;

verifying said access unit balance corresponding to said received token identifier exceeds a predetermined number;

selecting a resource location from among a plurality of resource locations in response to said received token identifier;

transferring information of said information type from said central computer to said customer computer if said access unit balance exceeds a predetermined number; and debiting said access unit balance in response to transfer of said information.

2. The method recited in claim 1, wherein:

said step of selecting a selected resource location comprises the step of selecting a remote computer resource location from among a plurality of remote computer resource locations in response to said received token identifier; and said method further comprises the steps of:

establishing data communication between said central computer and said selected remote computer resource location via said computer network; and transferring information of said information type corresponding to said received token identifier from said selected remote computer resource location to said central computer.

3. The method recited in claim 2, wherein said software for establishing data communication with a computer receives hypertext information from said central computer in accordance with the hypertext transfer protocol (HTTP).

4. The method recited in claim 2, wherein said medium has recorded thereon software for establishing communication with a computer via a modem connection to a telephone network.

5. The method recited in claim 1, further comprising the step of increasing said recorded number of access units in exchange for further payment from said customer.

6. The method recited in claim 1, wherein said token identifier is a serial number.

7. The method recited in claim 1, wherein visual indicia associated with each data storage medium indicates to said customer said selected information type.

8. The method recited in claim 7, wherein said visual indicia comprises printed matter on said data storage medium.

9. A method for retrieving a selected type of information from a remote computer resource location via a computer network in response to a prepayment, comprising the steps of:

providing a plurality of data storage media, each data storage medium having recorded thereon communication software, each data storage medium having associated with it a token identifier corresponding to an information type of a plurality of predetermined information types;

providing a central computer having a memory for storing token records, each token record corresponding to one computer data storage medium and including said token identifier and a corresponding access unit balance;

issuing each said data storage medium to a customer in exchange for a payment corresponding to said access unit balance;

loading a selected one of said data storage media into a customer computer;

establishing data communication between said central computer and said customer computer under control of said communication software recorded on said selected one of said data storage media;

receiving said token identifier recorded on said selected on of said data storage media at said central computer;

comparing said received token identifier to said token identifier of said token records;

verifying said access unit balance corresponding to said received token identifier exceeds a predetermined number;

transferring information of said information type from said central computer to said customer computer in accordance with a distributed hypermedia information transfer protocol if said access unit balance exceeds a predetermined number; and debiting said access unit balance in response to transfer of said information.

10. The method recited in claim 9, wherein said distributed hypermedia information transfer protocol includes the hypertext transfer protocol (HTTP).

11. A system for controlling access to electronically stored information comprising:

a plurality of computer data storage media, each data storage medium having recorded thereon communication software for establishing data communication between a customer computer reading said medium and a central computer, each data storage medium having associated with it a token identifier corresponding to an information type of a plurality of predetermined information types;

a central computer having a memory in which is stored token records, each token record corresponding to one computer data storage medium and including a token identifier and a corresponding access unit balance, said central computer including:

receiving means for receiving said token identifier associated with said computer data storage medium, token verification means for verifying said received token identifier corresponds to a token identifier of said token records;

payment verification means for verifying said access unit balance corresponding to said received token identifier exceeds a predetermined number;

selection means for selecting a selected resource location in response to said received token identifier;

transfer means for transferring information of an information type corresponding to said received token identifier from said selected resource location to said customer computer;

monitoring means for determining a measure of said transferred information;

debit means for debiting said access unit balance corresponding to said received token identifier by an amount corresponding to said measure of said transferred information; and prevention means for preventing further transfer of information to said customer computer when said access unit balance corresponding to said received token identifier is below a predetermined number.

12. The system recited in claim 11, wherein:

said selection means comprises means for selecting a remote computer resource location from among a plurality of remote computer resource locations in response to said received token identifier; and said transfer means comprises means for transferring information of an information type corresponding to said received token identifier from said selected remote computer resource location to said central computer and in turn to said customer computer.

13. The system recited in claim 12, wherein said transferring step comprises the step of transferring hypertext information in accordance with hypertext transfer protocol (HTTP).

14. The system recited in claim 12, wherein said communication software controls communication via a modem connection of said customer computer to a telephone network.

15. The system recited in claim 11, further comprising the step of increasing said access unit balance in exchange for further payment from said customer.

16. The system recited in claim 11, wherein said token identifier is a serial number.

17. The system recited in claim 11, further comprising visual indicia associated with said medium indicates to said customer said selected information type.

18. The system recited in claim 17, wherein said visual indicia comprises printed matter on said medium.

19. A system for controlling access to electronically stored information comprising:

a plurality of data storage media, each data storage medium having recorded thereon communication software for establishing data communication between a customer computer reading said medium and a central computer, each data storage medium having associated with it a token identifier corresponding to an information type of a plurality of predetermined information types;

a central computer having a memory in which is stored token records, each token record corresponding to one computer data storage medium and including a token identifier and a corresponding access unit balance, said central computer including:

receiving means for receiving said token identifier associated with said computer data storage medium, token verification means for verifying said received token identifier corresponds to a token identifier of said token records;

payment verification means for verifying said access unit balance corresponding to said received token identifier exceeds a predetermined number;

transfer means for transferring information of an information type corresponding to said received token identifier from said central computer to said customer computer in accordance with a distributed hypermedia information transfer protocol;

debit means for debiting said access unit balance corresponding to said received token identifier; and prevention means for preventing further transfer of information to said customer computer when said access unit balance corresponding to said received token identifier is below a predetermined number.

20. The system recited in claim 19, wherein said distributed hypermedia information transfer protocol includes the hypertext transfer protocol (HTTP).

* * * * *